United States Patent
Sakikawa

(10) Patent No.: US 8,456,680 B2
(45) Date of Patent: Jun. 4, 2013

(54) PRINTER NETWORK SYSTEM, SERVER DEVICE, AND COMPUTER-READABLE RECORDING MEDIUM

(75) Inventor: Ichiro Sakikawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 386 days.

(21) Appl. No.: 12/851,730

(22) Filed: Aug. 6, 2010

(65) Prior Publication Data

US 2011/0043854 A1 Feb. 24, 2011

(30) Foreign Application Priority Data

Aug. 19, 2009 (JP) .................................. 2009-189698

(51) Int. Cl.
*G06F 3/12* (2006.01)

(52) U.S. Cl.
USPC .......... 358/1.15; 358/1.9; 358/1.14; 358/1.16

(58) Field of Classification Search
USPC ........................................ 358/1.13–1.18, 1.9
See application file for complete search history.

(56) References Cited

U.S. PATENT DOCUMENTS

| 7,256,904 | B1 * | 8/2007 | Shima | 358/1.15 |
| 8,107,103 | B2 * | 1/2012 | Nuggehalli et al. | 358/1.14 |
| 8,264,715 | B2 * | 9/2012 | Nuggehalli | 358/1.15 |
| 2002/0097431 | A1 * | 7/2002 | Ikegami | 358/1.15 |
| 2003/0151766 | A1 * | 8/2003 | Clough et al. | 358/1.15 |
| 2004/0111610 | A1 * | 6/2004 | Slick et al. | 713/160 |
| 2005/0179929 | A1 * | 8/2005 | Jain | 358/1.14 |
| 2007/0002355 | A1 * | 1/2007 | Kai | 358/1.13 |
| 2007/0146768 | A1 * | 6/2007 | Isoda | 358/1.14 |
| 2008/0246985 | A1 * | 10/2008 | Patwardhan et al. | 358/1.15 |
| 2009/0244594 | A1 * | 10/2009 | Nuggehalli et al. | 358/1.15 |

FOREIGN PATENT DOCUMENTS

| JP | 2003-140867 | 5/2003 |
| JP | 3729229 | 12/2005 |

OTHER PUBLICATIONS

"Change_Ro" of Ricoh Company, accessed on Jul. 17, 2009 (URL: http://www.ricoh.co.jp/opp/priport/option/control/change_ro/).

\* cited by examiner

*Primary Examiner* — Dennis Dicker
(74) *Attorney, Agent, or Firm* — IPUSA, PLLC

(57) ABSTRACT

In a printer network system including a client device and a server device connected to the client device via a network, the server device includes a virtual print processor unit which receives a request of a print job from an application unit of the client device and generates image data as intermediate data and job definition data that define print settings of the print job, and an exclusive access control unit which controls exclusively writing and reading of the image data and the job definition data. The client device includes an output condition control unit which determines one of output destinations meeting conditional information in accordance with predetermined rules. A delivering unit acquires the job definition data and the image data by communicating with the exclusive access control unit, selects a printer driver corresponding to the output destination, and transmits a print command to the printer driver.

13 Claims, 10 Drawing Sheets

FIG.7

| JOB IDENTIFIER | JOB DEFINITION DATA NAME | IMAGE IDENTIFIER | COMPLETION OF INT. DATA (YES/NO) | INT. DATA ACCESS INFO. |
|---|---|---|---|---|
| JOB0001 | JCF0001 | IMG0001001,IMG0001002,... | YES | ... |
| JOB0002 | JCF0002 | IMG0002001,IMG0002002,... | YES | ... |
| ... | ... | ... | ... | ... |

| IDENTIFIER | PRINTER NAME |
|---|---|
| 192.168.28.21 | PRINTER-A |
| 192.168.8.230 | PRINTER-B |
| 192.168.240.1 | PRINTER-C |
| ... | ... |

800B

| IDENTIFIER | PRINTER NAME |
|---|---|
| USER-1 | PRINTER-A |
| USER-2 | PRINTER-B |
| USER-3 | PRINTER-C |
| ... | ... |

800C

| IDENTIFIER | CONTENT OF OUTPUT | PRINTER NAME |
|---|---|---|
| USER-1 | LABEL PRINTING | PRINTER-A |
| USER-2 | FORM PRINTING-1 | PRINTER-B |
| USER-3 | FORM PRINTING-2 | PRINTER-C |
| USER-4 | IMAGE PRINTING | PRINTER-D |
| ... | ... | ... |

PRINTER NETWORK SYSTEM, SERVER DEVICE, AND COMPUTER-READABLE RECORDING MEDIUM

BACKGROUND OF THE INVENTION

1. Field of the Invention

The present disclosure generally relates to a printer system, and more particularly to a printer network system, a server device, and a computer-readable recording medium, which are adapted to select one of output destinations in a network according to specific output conditions in response to a print job requested from a client terminal and distribute the print job to the selected output destination to perform the printing.

2. Description of the Related Art

In recent years, with the spread of networking technology, plural image forming devices, such as MFP (multi-function peripherals) and laser printers, are connected to a network in office environments of government and municipal offices, companies, universities, etc., and, in many cases, use of the image forming devices from various remote locations in the network is possible.

In a case of a final printout image which has a low security level or does not contain personal or confidential information, a serious problem may not arise even if a user erroneously designates a wrong output destination for a print job in selecting one of the image forming devices in the office environment where use of the image forming devices from various remote locations in the network is possible, and the output image is printed at the wrong output destination.

However, in a case of a final printout image containing personal or confidential information, erroneous designation of an output destination may cause a serious problem, such as a leak of the personal or confidential information, to arise if the document image is printed at a wrong output destination in the environment. Hence, there is a request for selecting an output destination from among the image forming devices in the environment where use of the image forming devices is possible and for outputting a document image at the correct location in the network.

Besides the viewpoint of the security level of the final printout, there is also a request for selecting an output destination from among the image forming devices in the environment. If a fixed image forming device is selected as the output destination in accordance with a specific user or a specific user group or in accordance with a characteristic of a print job, the efficiency of business operations may be increased, and the printed matter being handled in the environment may be easily managed, which will improve the management of security of the printed matter.

Various kinds of technology for determining an output destination of printed matter are known. For example, the product information "Change_Ro" of Ricoh Company, accessed on Jul. 17, 2009 (URL: http://www.ricoh.co.jp/opp/priport/option/control/change_ro/), discloses a software module which automatically switches an optimal output device among output devices in the Windows (registered trademark) environment in accordance with the number of sheets of a final printout image and distributes the document image to the optimal output device.

Japanese Laid-Open Patent Publication No. 2003-140867 discloses a network server which is connected to a network and arranged to request status information of a designated output device and receives the status information from the designated output device. When it is detected from the received information that the designated output device is in a status that a print error takes place or the printing cannot be performed immediately, the network server transmits the status information of the designated output device and status information of another output device to an information processing device.

Japanese Patent No. 3729229 discloses a client device which causes an alternative printer to be used to perform the printing of an output document image when the printing of the document image by the designated printer is impossible.

However, the printer network system according to the related art is directed to changing the output destination to another output device when the designated output device does not continuously perform the printing. The printer network system according to the related art is not aimed at preventing leaking of the confidential or personal information contained in the output document image.

Moreover, the printer network system according to the related art is not adequate for being applied to a server/client environment (point and print environment) in which a document image is printed by connecting a client terminal to a printer server.

In a case in which the selection of an output destination and the distribution of a print job to the determined output destination are applied to the server/client environment, if a print error, such as a paper jam, occurs at the determined output destination where the print job is distributed, the printer server can detect the occurrence of the print error. However, there is a problem that it is difficult for the client terminal (from which the user has actually requested the print job) to detect appropriately the print error occurring in the image forming device or an error status of the image forming device.

If the print error is not notified to the user in an appropriate manner, the user is uncertain as to whether the output document image has been printed at another output destination or whether the output document image has not been printed due to an error of the requested print job. This may cause a serious problem when a document image containing confidential information is dealt with.

SUMMARY OF THE INVENTION

In one aspect, the present disclosure provides a printer network system, a server device, and a computer-readable recording medium which are capable of selecting one of output destinations in an appropriate manner in a server/client environment to distribute a print job to the determined output destination, and capable of notifying a user of an error status of an image forming device in an appropriate manner to maintain a high level of security of the information contained in the output document image.

In an embodiment which solves or reduces one or more of the above-mentioned problems, the present disclosure provides a printer network system including a client device and a server device connected to the client device via a network, the server device including: a virtual print processor unit to receive a request of a print job from an application unit of the client device and generate, in response to the request, image data as intermediate data of the print job and job definition data that define print settings of the print job; and an exclusive access control unit to control exclusively writing and reading of the image data and the job definition data to and from a storage unit, the client device including: an output condition control unit to determine one of output destinations meeting conditional information in accordance with predetermined rules; and a delivering unit to acquire the job definition data and the image data by communicating with the exclusive access control unit of the server device, select a printer driver corresponding to the determined output destination, and transmit a print command to the printer driver.

In an embodiment of the invention which solves or reduces one or more of the above-mentioned problems, the present disclosure provides a server device which is connected to a client device via a network, the server device including: a virtual print processor unit to receive a request of a print job from an application unit of the client device and generate, in response to the request, image data as intermediate data of the print job and job definition data that define print settings of the print job; a program provision unit to provide a program for the client device, the program, when executed by a computer, causing the computer to operate as an output condition control unit of the client device which determines one of output destinations meeting conditional information in accordance with predetermined rules, and operate as a delivering unit of the client device which selects a printer driver corresponding to the determined output destination and transmits a print command to the printer driver; and an exclusive access control unit to control exclusively writing and reading of the image data and the job definition data to and from a storage unit and transmit the image data and the job definition data to the delivering unit of the client device.

In an embodiment of the invention which solves or reduces one or more of the above-mentioned problems, the present disclosure provides a computer-readable recording medium storing a program which, when executed by a computer, causes the computer to execute a network printing method in a server device connected to a client device via a network, the method including: generating, by a virtual print processor unit, in response to a request of a print job received from an application unit of the client device, image data as intermediate data of the print job and job definition data that define print settings of the print job; providing, by a program provision unit, a program for the client device, the program, when executed by a computer, causing the computer to operate as an output condition control unit of the client device which determines one of output destinations meeting conditional information in accordance with predetermined rules, and operate as a delivering unit of the client device which selects a printer driver corresponding to the determined output destination and transmits a print command to the printer driver; and exclusively controlling, by an exclusive access control unit, writing and reading of the image data and the job definition data to and from a storage unit, and transmitting the image data and the job definition data to the delivering unit of the client device.

Other objects, features and advantages of the present disclosure will become more apparent from the following detailed description when read in conjunction with the accompanying drawings.

BRIEF DESCRIPTION OF THE DRAWINGS

FIG. 7 is a diagram illustrating a data structure of a job management table which is managed by an exclusive access control unit in the printer network system of this embodiment.

FIG. 8 is a diagram illustrating a data structure of an association table which is managed by an output condition control unit in the printer network system of this embodiment.

DETAILED DESCRIPTION OF THE PREFERRED EMBODIMENTS

A description will be given of embodiments of the present disclosure with reference to the accompanying drawings.

In the following, a printer network system 100 including a plurality of client devices 112-118 and a printer server 110 is illustrated as an exemplary printer network system including a client device and a server device according to the present disclosure.

Figure 1:
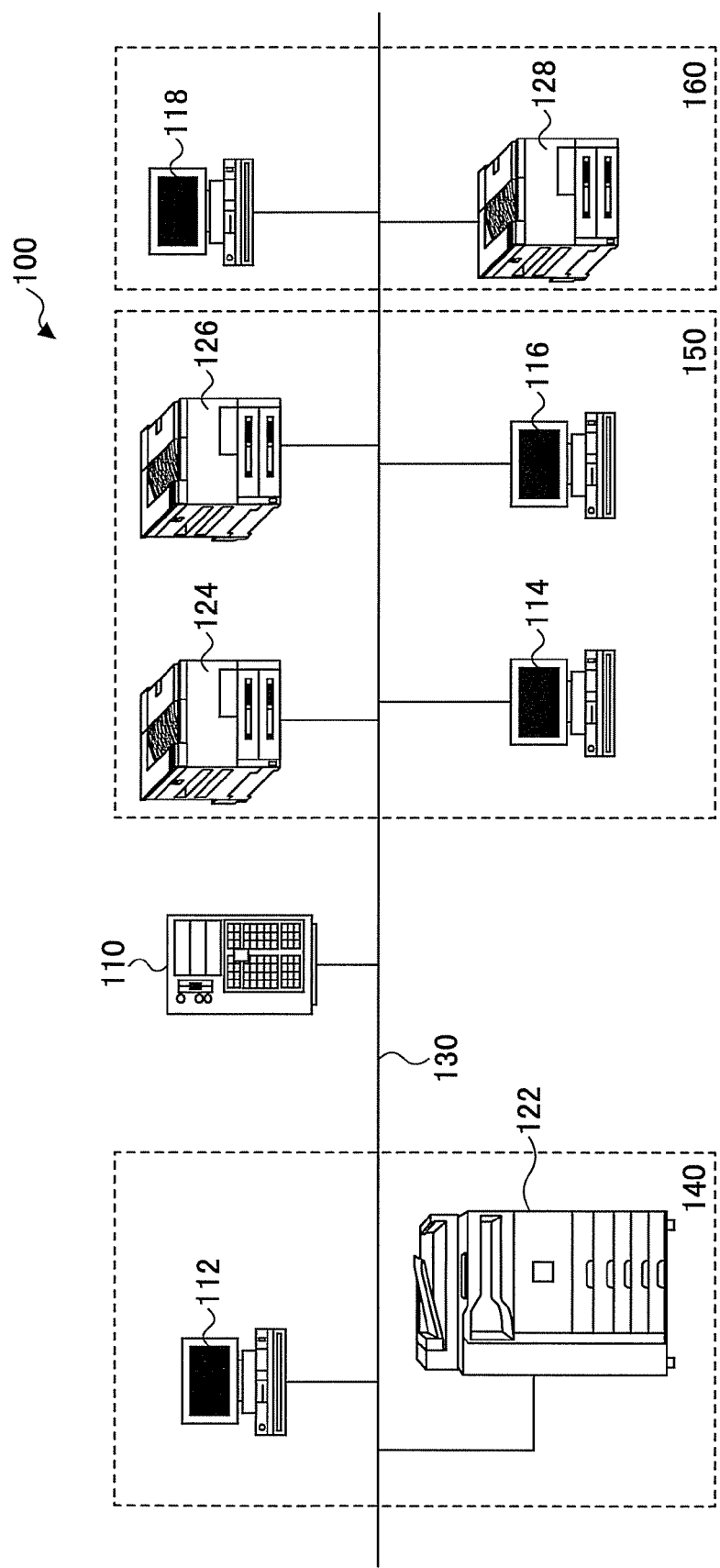
FIG. 1 is a diagram illustrating the composition of a printer network system of an embodiment of the present disclosure.

FIG. 1 illustrates the outline composition of the printer network system 100 of this embodiment. As illustrated in FIG. 1, in the printer network system 100, a plurality of client devices 112,114,116,118 are arranged and connected to a network 130 in an office environment. These client devices may also be referred to as terminal devices.

In the embodiment illustrated in FIG. 1, a plurality of image forming devices, including an MFP 122, laser printers 124 and 126, and an ink jet printer 128, are connected to the network 130 as remote printers. In the following, the MFP 122 and the printers 124-128 may also be referred to as remote printers. These remote printers constitute output destinations in the network for a print job requested from the client devices 112, 114, 116, 118.

In the printer network system 100 of this embodiment, one of the remote printers 122-128 which are output destinations may be determined corresponding to each of the client devices 112-118, and an output document image may be printed at any of the locations where the respective client devices are installed or at any remote printer arranged at the location in a vicinity of each client device.

Each of areas 140, 150 and 160 surrounded by the dotted line in FIG. 1 indicates a location. Specifically, in the embodiment illustrated in FIG. 1, the client device 118 and the remote printer 128 are arranged at a location 160, the client devices 114, 116 and the remote printers 124, 126 are arranged at a location 150, and the client device 112 and the remote printer 122 are arranged at a location 140.

Alternatively, plural client devices and plural remote printers may be arranged at each location, only a client device may be arranged at a location, or only a remote printer may be arranged at a location.

Furthermore, in the printer network system 100 of this embodiment, a printer server 110 is connected to the network 130, and this printer server 110 manages the printing requests received from the client devices 112,114,116,118.

When a printing request is received from any of the client devices 112-118, the printer server 110 temporarily generates shared intermediate data based on the received printing request, and this intermediate data is convertible into raw data corresponding to the remote printer of each output destination. The client device which has sent the printing request to the printer server 110 reads out the intermediate data generated by the printer server 110, selects a appropriately determined output destination from among the remote printers 122-128 in accordance with predetermined rules, and transmits, to the determined output destination, transmission data in the form that is receivable by a printer driver corresponding to the remote printer of the determined output destination. The printer driver which has received the transmission data converts the transmission data into the raw data, and sends the raw data to the designated remote printer to perform the printout.

The remote printer which is the determined output destination may be determined in conformity with various kinds of conditional information. Examples of the conditional information may include: identifier information specific to the client device (terminal device), such as a MAC (media access control) address of the client device or an IP (Internet protocol) address of the client device; identifier information specific to the user, such as a login user name or a user's authority level; print-setting information of the print job, such as setting of color mode, stamp printing or ground tint printing; and job-content information, such as a document name, the number of pages or presence of a secret keyword. In this embodiment, it is assumed that the remote printer which is the determined output destination is determined in conformity with one or more of the above-described kinds of conditional information.

However, the output conditions which are determined in conformity with the conditional information are not restricted. The output conditions may include, in addition to the remote printer of the output destination, a change of the contents of a printout, such as setting of double-side printing, setting of monochrome printing, setting of intensive printing, setting of ground tint printing, setting of digital watermarking, setting of confidential printing, and substitution of character string in image data.

In this embodiment, the printer server 110 includes a single-core or multiple-core CPU, a ROM, a RAM, a hard disk drive, etc. The printer server 110 operates under control of an operating system (OS), such as, Windows (registered trademark) 200X server, UNIX (registered trademark), LINUX (registered trademark) or Solaris (registered trademark). The printer server 110 generates the intermediate data of a print job requested from a client device.

Each of the above-described client devices 112-118 has the same composition and may be implemented as a fat client. Each of the client devices 112-118 may be constituted as a personal computer, a workstation, etc., and may be constructed to include a single-core or multiple-core CPU, a ROM, a RAM, a hard disk drive, an I/O device, etc.

Each of the client devices 112-118 reads an application program and data from the hard disk drive and loads them to the RAM. When the application program is executed by the CPU, the client device generates a document file which is a printing object, and this document file contains electronic data of a document, an image, multimedia, or a combination thereof.

Each of the client devices 112-118 is capable of acquiring a program of a virtual printer driver from the printer server 110 via the network 130 and capable of installing the program on the client device so that the client device is allowed to use the virtual printer driver of this embodiment. When a printing request of a document file in which the virtual printer driver is designated is sent by the client device, the printer server 110 generates the intermediate data based on the printing request. The client device reads the intermediate data which is generated by the printer server 110, and transmits a print command to the printer driver corresponding to the determined output destination. A description of the virtual printer driver will be given below.

The network 130 may be constituted to include Ethernet (registered trademark), such as 1000 Base-TX, an optical network, and a wireless network which is in conformity with the standard of IEEE 802.11, etc. The network 130 carries out a cross-link communication by the frame or TCP/IP protocol based packet communication. The network 130 may be constructed to include a LAN (local area network) and a WAN (wide area network), such as the Internet arranged under a secure environment including a VPN (virtual private network).

Figure 2:
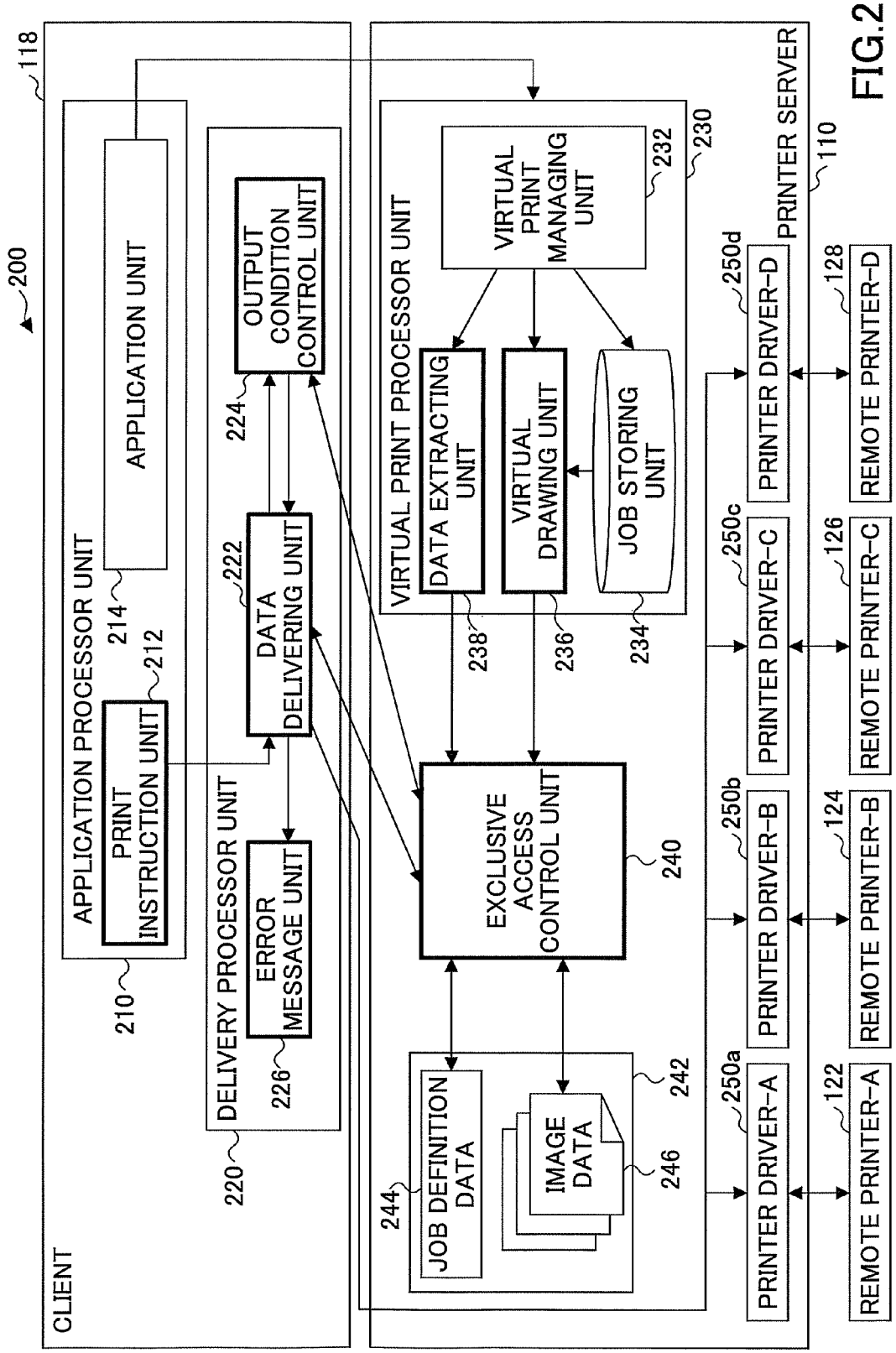
FIG. 2 is a block diagram illustrating the functional composition of the printer network system of this embodiment.

FIG. 2 illustrates the functional composition 200 of the printer network system 100 of this embodiment. In the functional composition 200 of FIG. 2, the client device 118 is illustrated as a representative one of the client devices 112-118.

As illustrated in FIG. 2, the functional composition 200 includes the client device 118 and the printer server 110. Each device is constituted to include two or more function units, respectively. The client device 118 is constituted to include an application processor unit 210 and a delivery processor unit 220. The printer server 110 is constituted to include a virtual print processor unit 230, an exclusive access control unit 240, and a plurality of printer drivers 250a-250d (a printer driver-A, a printer driver-B, a printer driver-C, a printer driver-D). The printer drivers 250a-250d correspond to the remote printers 122-128 respectively. These function units operate on each computer of the client device 118 and the printer server 110 when the program is loaded to the RAM and executed by the CPU.

The application processor unit 210 which operates on the client device 118 is to perform an application process of generating a document file (which is a printing object) and transmitting a printing request for printing the document file. Specifically, the application processor unit 210 includes an application unit 214 configured to generate and edit the document file of the printing object, and a print instruction unit 212 configured to receive a printing instruction input from a user using a mouse event. The print instruction unit 212 is a user-interface module of the virtual printer driver according to the present disclosure for determining print settings to be loaded to the application processor unit 210.

If a document file is generated by the application unit 214 and a printing request from the user is received by the print instruction unit 212, a print command event takes place. In response to this print command event, the application unit 214 generates job data of a print job (which may also be referred to as a job) through a function call, such as GDI (graphic device interface), and transmits the generated job data to the printer server 110 through a suitable remote connection, such as RPC (remote procedure call) connection.

Furthermore, in response to the print command event, the print instruction unit 212 determines an output destination and initiates the delivery processor unit 220 on the client device 118. This delivery processor unit 220 is configured to deliver the print data to the printer driver of the determined output destination.

The delivery processor unit 220 which is initiated on the client device 118 is to perform a data transmission application process of distributing a print job to an appropriately determined output destination. The delivery processor unit 220 includes an output condition control unit 224, a data delivering unit 222, and an error message unit 226. Specifically, the output condition control unit 224 determines an output destination in accordance with predetermined rules. The data delivering unit 222 delivers the print data to the printer driver of the determined output destination. The error message unit 226 notifies the user of an error when the error takes place during the process of the print job. It is preferred that the output condition control unit 224 is provided as a plug-in module which may be incorporated in the delivery processor unit 220 in a manner corresponding to a specific use.

In the printer server 110, a virtual print processor unit 230 is to perform a spooler process of sequentially processing two or more print jobs in order of generation of the jobs. The virtual print processor unit 230 includes a virtual print managing unit 232, a job storing unit 234, a virtual drawing unit 236, and a data extracting unit 238. Specifically, the virtual print managing unit 232 manages progress of the processes of print jobs requested from the client devices 112-118 respectively. The job storing unit 234 temporarily stores the job data of a print job requested from the application unit 214 of each client device. The job storing unit 234 may be implemented as a printer buffer or a storage region to store a printing spool file in accordance with the actual composition of the printer server 110. The job storing unit 234 is not restricted according to the implementation form of a specific OS.

The job data are constituted to contain image data and job definition data. The job data is the data in the form of a printing spool file, such as EMF (enhanced metafile) data, XPS (XML paper specification) data, PostScript (registered trademark) data, PICT (QuickDraw Picture, a graphics file format) data or PDF (portable document format) data. It is preferred that the image data contained in the job data include high-level image data, such as EMF data, Postscript data, or XPS data. The image data contained in the job data may include low-level image data, such as bit map data, JPEG data, or GIF data. Alternatively, the image data contained in the job data may include both high-level image data and low-level image data. The job definition data contained in the job data include various print settings, including a source identifier which uniquely identifies the source of a printing request, such as identifier information specific to a client device (terminal) or identifier information specific to a user, positional information of image data to be pasted, a designation of color mode, a designation of intensive printing, a margin, a size, the number of pages, and a document name. In a case of the Windows (registered trademark) environment, the job data and the image data may be preferably used as the data in the EMF format.

When the job data from the application unit 214 is received, the virtual print processor unit 230 calls the virtual print managing unit 232 and causes the job storing unit 234 to temporarily store the job data as a spool file. Subsequently, the virtual print managing unit 232 calls the virtual drawing unit 236 and causes the virtual drawing unit 236 to read the job data from the job storing unit 234 and transfer the image data contained in the job data to a working area 242 on the basis of a predetermined unit (for example, on a page basis) through the exclusive access control unit 240, so that an image data 246 of high-level image format is generated in the working area 242.

Furthermore, the virtual drawing unit 236 acquires the print settings (the affixing information) from the read job data and generates a job definition data 244 in the working area 242 through the exclusive access control unit 240.

In a case of the Windows (registered trademark) system, the transfer of the image data is carried out as follows. The EMF file generated by the spooler may be divided into data items on the basis of a predetermined unit (or on a page basis) by the print processor, and the data items are copied to the working area 242. Alternatively, the graphic module may generate EMF data in the working area 242 on a page basis.

Furthermore, the virtual print managing unit 232 calls the data extracting unit 238 and causes the data extracting unit 238 to extract the job definition data from the job data stored in the job storing unit 234 and write the contents of the print settings to the job definition data 244 of the working area 242 through the exclusive access control unit 240. In a case of the Windows (registered trademark) environment, the storing of the job definition data is carried out by the print processor or the graphic module such that the contents of the print setting structure DEVMODE are written to the job definition data 244 of the working area 242.

These intermediate data items stored in the working area 242 are individually accessed by the delivery processor unit 220 which operates on the client device 118 and by the virtual print processor unit 230 which operates on the printer server 230 separate from the client device 118. This will be described later.

The exclusive access control unit 240 controls exclusively the timing of writing of the data to and the timing of reading of the data from the working area 242 by the function modules 220 and 230 of the two separate computers in order to avoid occurrence of data mismatching suitably. The working area 242 may be provided as a storage region, such as the HDD or memory of the printer server 110. The working area 242 is not restricted as long as the exclusive access control unit 240 can access it. The working area 242 may be provided as a storage region, such as a shared folder of another computer connected to the network.

In this embodiment, the job definition data 244 and the image data 246 which are generated as intermediate data items of a print job are associated with a job ID which uniquely identifies the print job. This job ID is shared between the delivery processor unit 220, the virtual print processor unit 230, and the exclusive access control unit 240, and any print job is uniquely identified by its job ID. The method of sharing a job ID is not restricted. For example, a typical method of sharing a job ID is as follows. The virtual print managing unit 232 generates, when a printing request is received, a job ID which uniquely identifies a print job currently initiated. Then, the virtual print managing unit 232 associates each of the job definition data 244 and the image data 246 with the job ID, and stores these data items with the associations in the working area 242 through the exclusive access control unit 240. On the other hand, the print instruction unit 212 receives the job ID from the virtual print managing unit 232 and provides the job ID as an argument when initiating the delivery processor unit 220.

In the client device 118, the initiated data delivering unit 222 of the delivery processor unit 220 detects an end of writing all the intermediate data items of the print job, communicates with the exclusive access control unit 240, and acquires the job definition data 244 and the image data 246 from the working area 242, so that the client device 118 is ready for the process of distributing the print job. When writing all the intermediate data items of the print job is completed, the exclusive access control unit 240 records the end of the data generation. The data delivering unit 222 is able to detect the end of writing the intermediate data items, for example, by periodically accessing the exclusive access control unit 240 by means of the job ID.

FIG. 7 illustrates a data structure of a job management table which is managed by the exclusive access control unit 240. In the job management table 700 of FIG. 7, with respect to each print job, a job ID, a job definition data name, an image ID which identifies an image data, a flag that indicates whether writing intermediate data items is completed, and an intermediate data-access information that indicates the state of accessing the intermediate data items are associated together and managed by the exclusive access control unit 240.

The intermediate data-access information indicates the state of accessing the job definition data and the image data, and, with respect to each intermediate data item, this information has a value which indicates one of a "waiting" state (in which neither reading nor writing is made), a "writing" state, and a "reading" state.

For example, when an access request for accessing an intermediate data item (for example, the job definition data) of a certain print job identified by its job ID takes place, the exclusive access control unit 240 acquires the access state of the intermediate data item by making reference to the intermediate data-access information associated with the job ID. When a write request is received and the access state of the intermediate data item is "waiting", the exclusive access control unit 240 updates the intermediate data-access information to the "writing" state and locks the intermediate data-access information. After the writing of the intermediate data item is performed, the exclusive access control unit 240 updates the intermediate data-access information to the "waiting" state at the end of the writing.

On the other hand, if the intermediate data-access information is the "reading" state or the "writing" state, the processing of an access request is stopped or an error message is transmitted to the function module of the requesting source until the intermediate data-access information is shifted to the "waiting" state so that the requesting source may send an access request to the exclusive access control unit 240 again.

Similarly, when a read request is received and the access state of the intermediate data item is "waiting", the exclusive access control unit 240 updates the intermediate data-access information to the "reading" state and locks the intermediate data-access information. After the reading of the intermediate data item is performed and transmitted to the function module of the requesting source, the exclusive access control unit 240 updates the intermediate data-access information to the "waiting" state at the end of the reading.

The exclusive access control unit 240 updates the flag to indicate that writing the intermediate data items associated with the job ID in the job management table 700 is completed, when the storing of all the intermediate data items is completed.

In this embodiment, it is assumed that the data acquisition by the data delivering unit 222 is initiated after the storing of all the intermediate data items is completed. However, as long as the data delivering unit 222 can acquire correctly all the intermediate data items needed for a print job of a processing object, the arrangement of the data delivering unit 222 is not limited to this embodiment. Alternatively, the data delivering unit 222 may be arranged to initiate acquisition of the intermediate data items before the storing of all the intermediate data items is completed. In this case, the exclusive access control unit 240 may initiate transmission of the generated intermediate data item before the end of the intermediate data generation. After the writing of all the intermediate data items is completed, transmission of the job definition data and the image data to the data delivering unit 222 will be completed.

Referring back to FIG. 2, in response to an inquiry from the data delivering unit 222, the output condition control unit 224 of the delivery processor unit 220 communicates with the exclusive access control unit 240 and acquires the conditional information including the requesting source identifier in the job definition data 244.

The output condition control unit 224 determines one of the output destinations matching the conditional information in accordance with the predetermined rules, and transmits a printer name which identifies the output destination printer, to the data delivering unit 222.

A method of determining an output destination is to use an association table in which the conditional information and the output destination are associated, as illustrated in FIG. 8.

FIG. 8 illustrates an association table 800 which is managed by the output condition control unit 224 in this embodiment.

As illustrated in FIG. 8, each of association tables 800A and 800B is an association table when the requesting source identifier is used as the conditional information.

Specifically, in the association table 800A, an IP address of each client device is used as the requesting source identifier of each of the client devices 112-118. Each IP address is associated with a printer name of a remote printer which is to be assigned for the client device to which the IP address is assigned and registered. Alternatively, an IP address may be made to indicate a range of IP addresses designated by a subnet mask. Alternatively, instead of the IP address, another address, such as a MAC address, may be used.

In the association table 800B, a user name which is input by the user at the time of login or read from an IC card of the user is used as the requesting source identifier of each of the client devices 112-118. Each user name is associated with a printer name which uniquely identifies a remote printer which is to be assigned for the client device of the user, and registered. In a case in which user names and output destinations are associated together and managed, a user name may be associated with a remote printer of a fixed output destination, irrespective of the client device used by the user. In this case, even if the client device used is changed, the user can send a print job to the fixed output destination certainly, without inputting changes of print settings to the client device. The operability and efficiency can be increased.

The association table 800C as illustrated in FIG. 8 is used for association of the output destination with a combination of the requesting source identifier, such as the user name, and the content of the output or printout. In the association table 800C, two network printers: the local printer-C and the local printer-D may be assigned to the same user-3.

When the content of the output is set to form printing or label printing, the printer functions differ. The format and the output function also differ even if the content is set to form printing, and the content of the output is used in order to determine the output destination based on these differences. The content of the output may be determined according to the information described in the job definition data obtained by communicating with the exclusive access control unit 240. When two or more remote printers are assigned to the same user, the client devices 112-118 may be arranged so that the highest level printer name registered is set to the default setting.

Referring back to FIG. 2, the data delivering unit 222 receives a notice of a printer name of the remote printer of the output destination from the output condition control unit 224 and sets the output destination of the transmission data. The data delivering unit 222 sends the print command to the printer driver 250 of the determined output destination, so that the printer driver 250 is caused to print the acquired image data of the high level image format in accordance with the acquired job definition data. When the affixing information, such as "2in1" setting, is contained in the job definition data, the data delivering unit 222 performs the affixing process of the image data on a page basis, converts the job definition data after the editing into the transmission data in the form that can be received by the printer driver 250, and transmits the resulting job definition data to the printer driver 250.

The printer driver 250 of the determined output destination converts, in response to the print command, the transmission data into the output data in the raw format that can be processed by the remote printer, and sends the resulting output data to a port monitor or the like, so that a final printout is output by the remote printer of the determined output destination.

When a specific remote printer is determined as the output destination and the printer driver 250 of the determined remote printer has a page alignment function or an affixing function, the data delivering unit 222 may transmit the transmission data in the format that can be received by the printer driver 250, such that the image data in the raw form is generated by the printer driver 250 by specifying the job definition data as the function-setting value of the printer driver 250. For example, most of the printer drivers in the Windows (registered trademark) environment can receive the EMF data. When the image data 246 is the EMF data, the conversion of image data is unneeded, and if the job definition data 244 is set to the printing setting structure DEVMODE, the target RAW data of the printer driver 250 can be generated.

If an error takes place in the remote printer of the output destination after the print command is output to the printer driver 250, the data delivering unit 222 receives an error message from the remote printer of the output destination. The error message unit 226 of the delivery processor unit 220 displays, in response to the error message, a notice of the error on the display unit of the client device, which notifies the user of the occurrence of the error.

It is preferred that the application unit 214 in this embodiment sends to the virtual print processor unit 230 a print job in the form which contains the high level image data. By sending the image data in the high level image format, the amount of data per image in a case of a color image can be reduced, and congestion of the network traffic of print jobs can be prevented. The output destination is not determined when the job data is received by the virtual print processor unit 230. If the level of the image format of the received image data is lower than the level of the drawing capability of the output destination, the drawing capability of the output destination will not be fully utilized. For this reason, it is preferred that the level of the drawing capacity reported to the application unit 214 by the virtual print processor unit 230 is adequately high.

Figure 3:
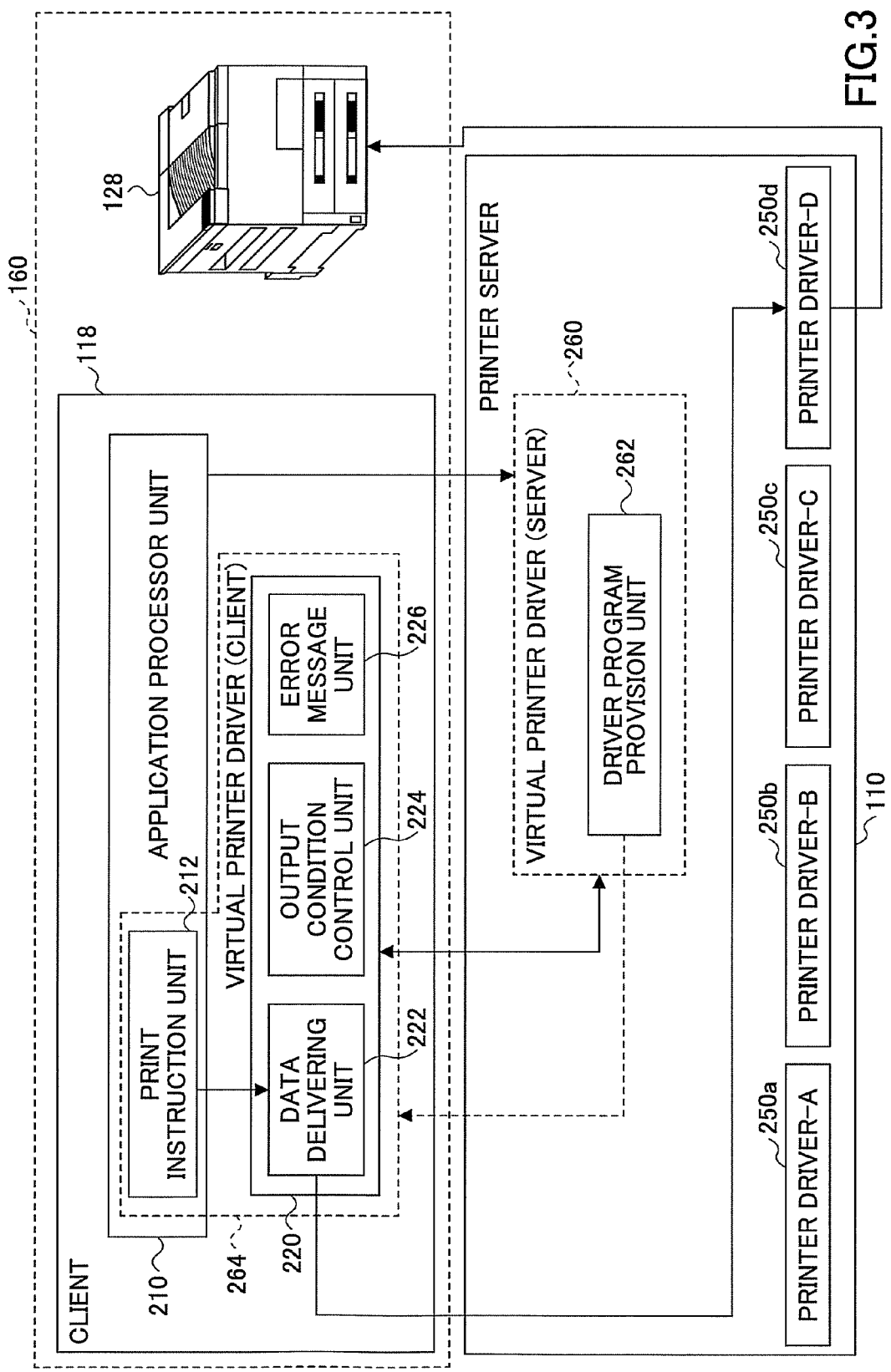
FIG. 3 is a diagram for explaining the processing which enables a client device to download a virtual printer driver to the client device in the printer network system of this embodiment.

Next, with reference to FIG. 3, the processing which enables a client device to download a virtual printer driver to the client device will be described. FIG. 3 is a diagram for explaining the processing which enables a client device to download a virtual printer driver to the client device in the printer network system of this embodiment. In FIG. 3, the client device 118 is illustrated as a representative one of the client devices 112-118.

It is supposed that a virtual printer driver 260 is installed beforehand in the printer server 110 of this embodiment, and this virtual printer driver 260 is shared in the network. The virtual printer driver 260 is constituted to include a driver program provision unit 262 and the components 236,238,240 of the printer server 110 as illustrated in FIG. 2. The driver program provision unit 262 is a function module which supplies, to the client device 118, in response to a request from the client device 118, a driver program, an updating program, setting data, etc., which are required to install components 212,222,224,226 of a virtual printer driver 264 in the client device 118. Moreover, the driver program provision unit 262 may be used to supply to the client device 118 the data for communicating with the printer drivers 250a-250d of the remote printers 122-128 incorporated in the printer network system 100 of this embodiment. Moreover, the driver program provision unit 262 may be used to supply to the client device 118 the association table 800 as a part of the setting data.

If a request for adding a virtual printer driver is sent from the client device 118 to the printer server 110, a printer connection, such as RPC, is established between the client device 118 and the printer server 110. In this state, the client device 118 downloads the required driver program and others from the driver program provision unit 262 of the printer server 110 and installs the components 212,222,224,226 of the virtual printer driver 264 in the client device 118. Accordingly, the print instruction unit 212, the data delivering unit 222, the output condition control unit 224, and the error message unit 226 are constituted on the client device 118. The function that carries out the above-described downloading processing is referred to as a point and print function in the WINDOWS (registered trademark) environment.

Among the functions of the printer network system of this embodiment, the function of the delivery processor unit 220 to perform the data transmission to the printer driver 250 is assigned to the client device, rather than to the printer server. Even if an error status occurs in the remote printer which is determined as the output destination, an error message is transmitted to the client device which is operated by the user who needs error information of the remote printer. It is possible to transmit a notice of an error to the user appropriately.

The components which operate on the client device are downloaded from the driver program provision unit 262 of the printer server 110 and installed in the client device. Hence, the labor needed to incorporate a new client device in the printer network system 100 can be reduced.

The respective delivery processor units 220 operate on the client devices in the environment of the printer network system 100 in which the plural client devices operate. The possibility that the problem of a print halt occurs due to an error of a remote printer in this case can be made lower than that in the case of the delivery processor unit 220 operating on the printer server. It is possible to keep the quality of a final printout high because the job definition data and the image data of the high level image format as the intermediate data are generated.

Next, the processing of a network printing method performed by the printer network system 100 of this embodiment will be described with reference to FIG. 4 and FIG. 5.

Figure 4:
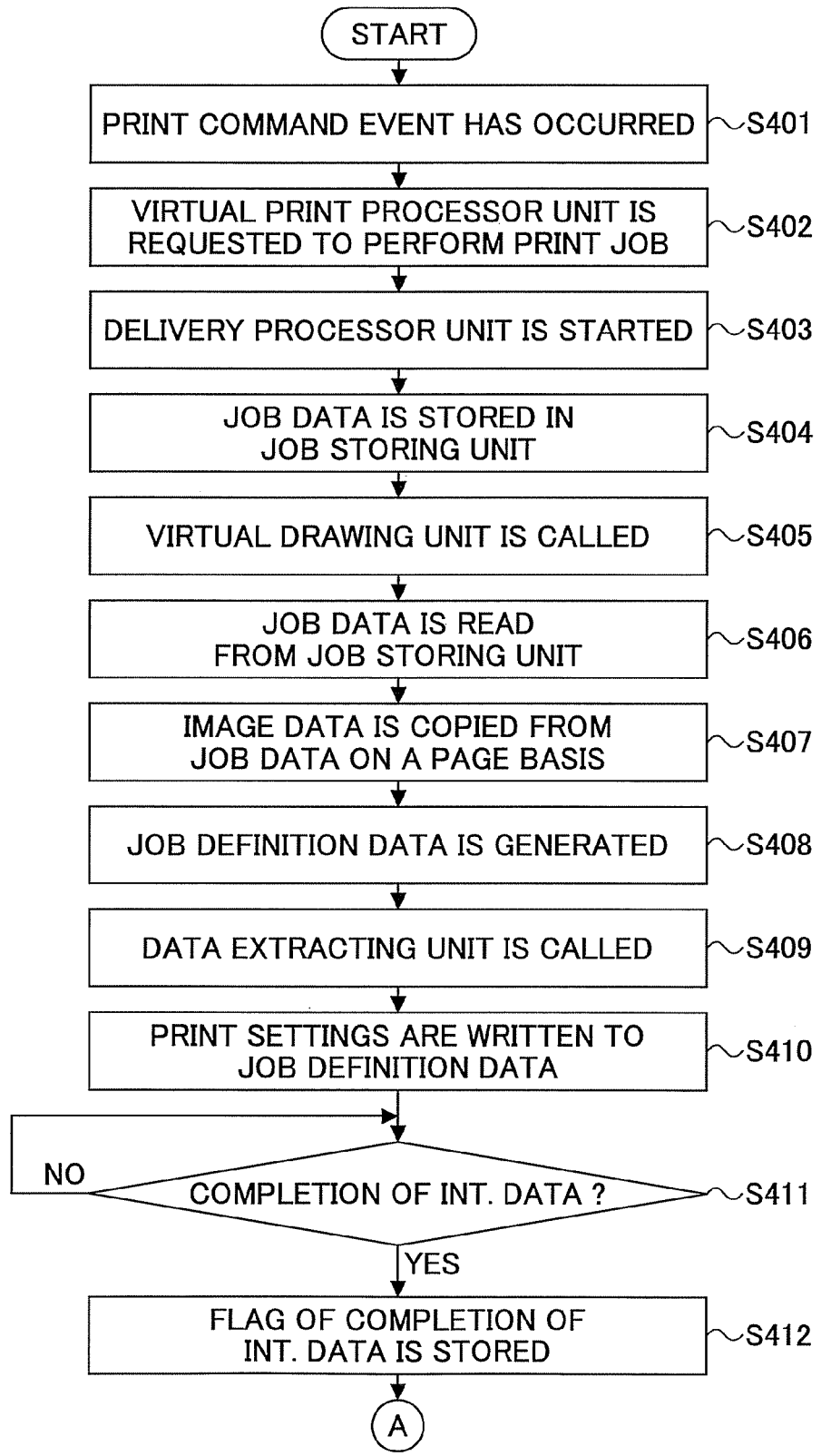
FIG. 4 is a flowchart for explaining a network printing method performed by the printer network system of this embodiment.
Figure 5:
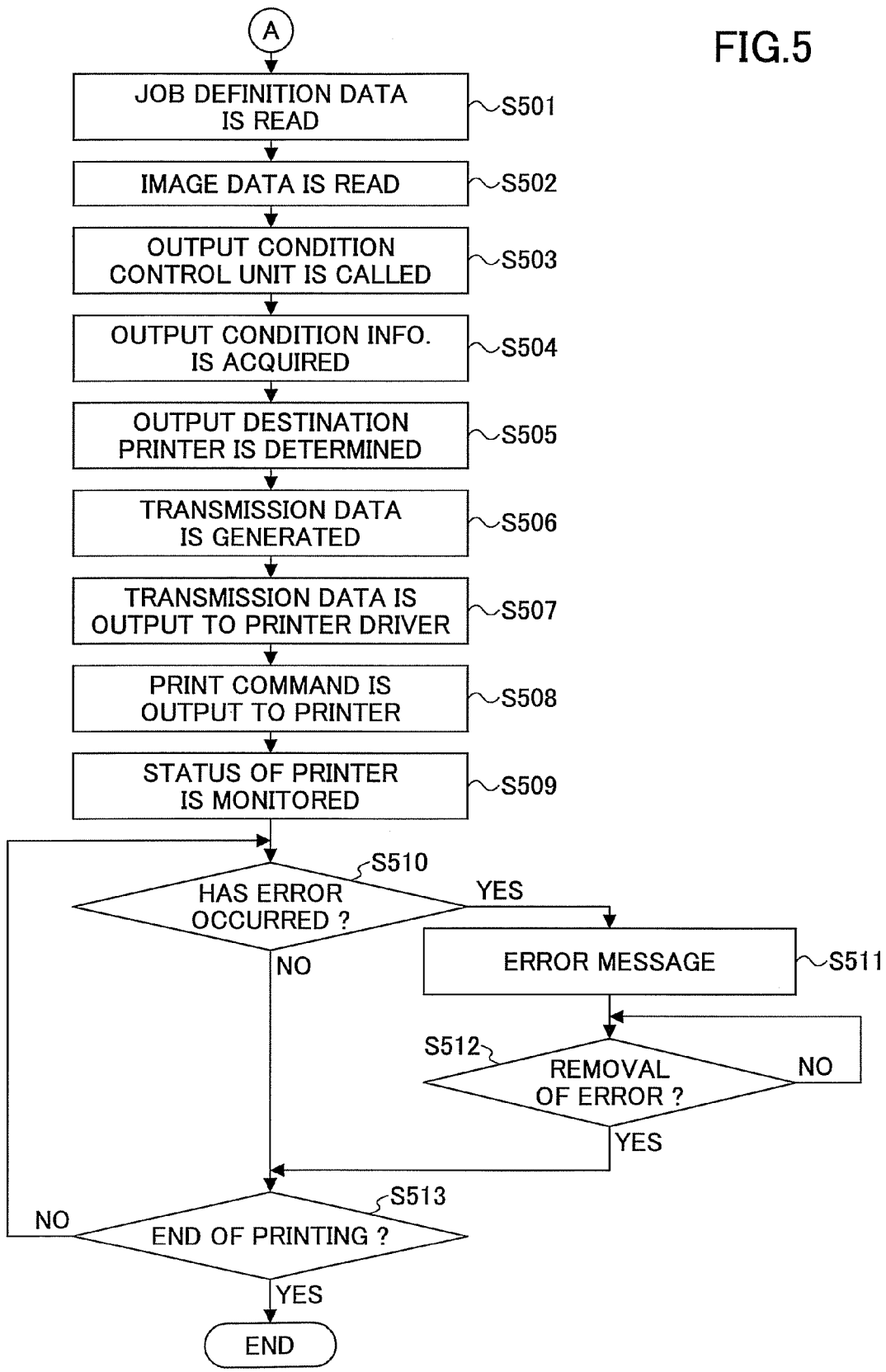
FIG. 5 is a flowchart for explaining the network printing method performed by the printer network system of this embodiment.

FIG. 4 and FIG. 5 are flowcharts for explaining the processing of the network printing method performed by the printer network system 100 of this embodiment. This processing will be described using the flowchart of FIG. 4 and the flowchart of FIG. 5 which are linked together at the point A.

Upon start of the processing of FIG. 4, in step S401, the print instruction unit 212 of the client device 118 receives selection of a virtual printer driver, registration of print settings and a printing request from a user, and detects occurrence of a print command event.

In step S402, the application unit 214 of the client device 118 sends a request of a print job to the virtual print processor unit 230 of the printer server 110, and transmits job data to the virtual print processor unit 230.

In step S403, the print instruction unit 212 initiates, in response to the print command event, the delivery processor unit 220 using the authority level that is the same as that of the application processor unit 210. In step S404, the virtual print managing unit 232 stores the job data received from the client device, in the job storing unit 234.

In step S405, the virtual print managing unit 232 calls the virtual drawing unit 236 by sending a processing request to the virtual drawing unit 236. In step S406, the virtual drawing unit 236 reads, in response to the request, the job data from the job storing unit 234. In step S407, the virtual drawing unit 236 requests the exclusive access control unit 240 to copy the image data from the job data on a page basis to the working area 242. When the request from the virtual drawing unit 236 is received, the exclusive access control unit 240 checks that the writing of the image data is possible, and writes the image data 246 on a page basis to the working area 242.

In step S408, the virtual drawing unit 236 further requests the exclusive access control unit 240 to write the print settings, such as the affixing information of the image data, from the job data to the working area 242 as job definition data. When the request from the virtual drawing unit 236 is received, the exclusive access control unit 240 checks that writing of the print settings is possible, and generates the job definition data 244 in the working area 242.

In step S409, the virtual print managing unit 232 calls the data extracting unit 238 by sending a processing request to the data extracting unit 238. In step S410, the data extracting unit 238 requests the exclusive access control unit 240 to write other print settings from the job data to the job definition data 244. When the request from the data extracting unit 238 is received, the exclusive access control unit 240 checks that writing of the print settings is possible and writes the print settings to the job definition data 244.

In step S411, the exclusive access control unit 240 determines whether writing of all the intermediate data items has been completed. The exclusive access control unit 240 repeats the determination at step S411 until it is determined that writing all the intermediate data items is completed.

When it is determined at step S411 that writing of all the intermediate data items is completed, the control is transferred to step S412.

In step S412, the exclusive access control unit 240 updates a flag to indicate that writing of all the intermediate data items of the job data is completed, and writes the flag to the job management table 700.

After the step S412 in the flowchart of FIG. 4 is performed, the control is transferred to step S501 in the flowchart of FIG. 5. As illustrated in FIG. 5, in step S501, the data delivering unit 222 of the delivery processor unit 220, which has been initiated at step S403, communicates with the exclusive access control unit 240, sends a reading request to the exclusive access control unit 240, and reads out the job definition data of the job data from the working area 242 via the exclusive access control unit 240.

In step S502, the data delivering unit 222 further sends a reading request to the exclusive access control unit 240 and reads out the image data of the job data from the working area 242 via the exclusive access control unit 240. In step S503, the data delivering unit 222 calls the output condition control unit 224 by sending an inquiry of an output destination thereto.

In step S504, the output condition control unit 224 sends an acquisition request to the exclusive access control unit 240 and acquires the conditional information, including the requesting source identifier described in the job definition data 244, via the exclusive access control unit 240. The information, such as an IP address, a MAC address, etc. of the client device, exists also in the client device in which the delivery processor unit 220 operates. Alternatively, when such requesting source characteristic data is used, the output condition control unit 224 may acquire the requesting source identifier from the system information of the client device.

In step S505, the output condition control unit 224 makes reference to the association table 800, determines an output destination corresponding to the acquired conditional information, and notifies a printer name of the determined output destination to the data delivering unit 222.

In step S506, the data delivering unit 222 edits the acquired image data of each page in accordance with the acquired job definition data and generates transmission data after the editing in the form that can be received by the printer driver.

In step S507, the data delivering unit 222 transmits the transmission data to the printer driver corresponding to the remote printer of the acquired printer name. When the transmission data is received, in step S508, the printer driver transmits a print command to the corresponding remote printer. In step S509, the data delivering unit 222 initiates the monitoring of an error status from the remote printer of the output destination.

In step S510, the data delivering unit 222 determines whether an error status has been notified from the remote printer of the output destination via the printer driver, and determines whether an error takes place.

When it is determined at step S510 that no error takes place, the control is transferred to step S513. On the other hand, when it is determined at step S510 that an error takes place, the control is transferred to step S511. In step S511, the error message unit 226 sends a notice of the error to the user of the client device 118 so that an error message as illustrated in FIG. 10 is displayed on the display unit of the client device 118, and the control is transferred to step S512.

Figure 10:
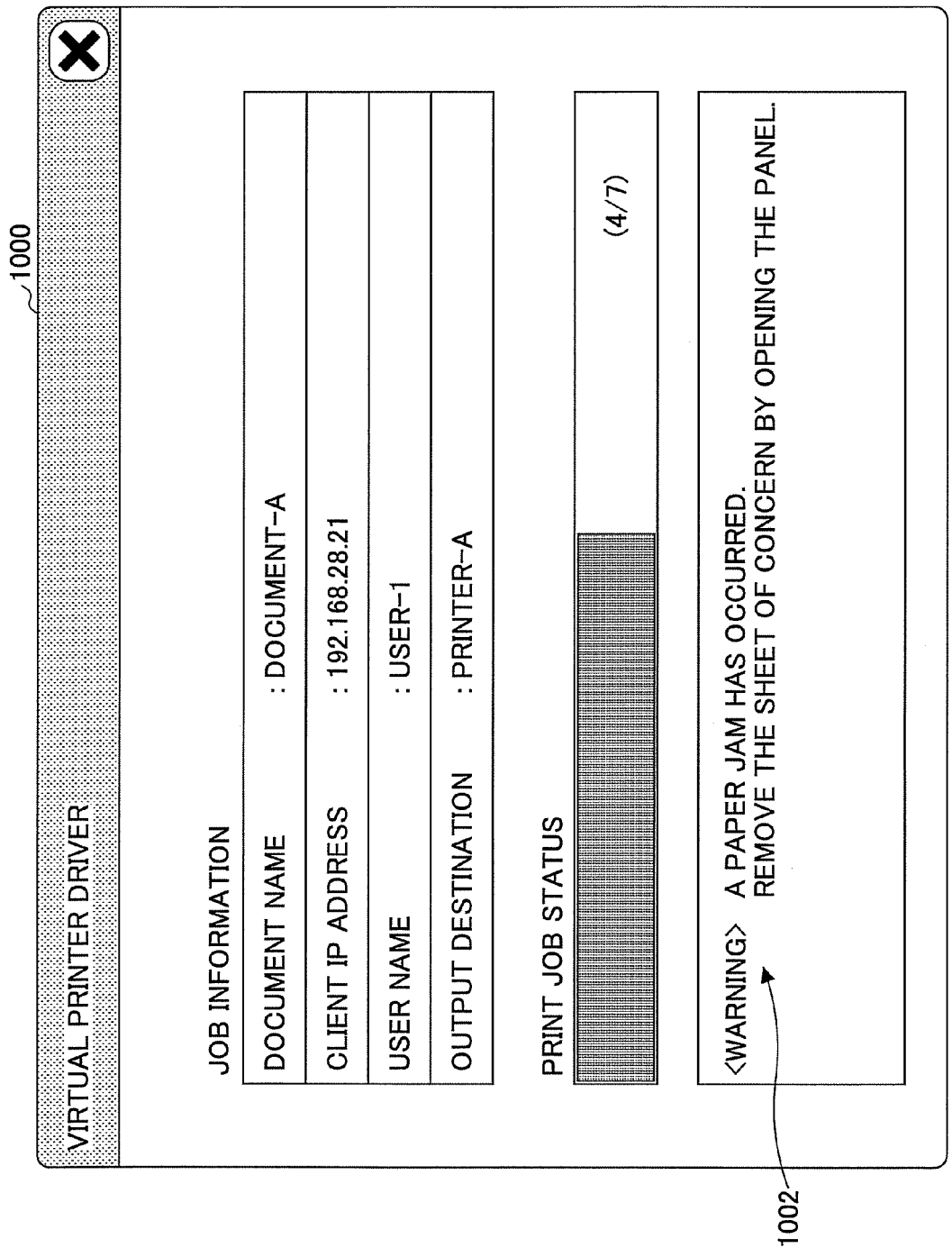
FIG. 10 is a diagram illustrating a graphical user interface containing an error message displayed on the display unit of the client of this embodiment.

FIG. 10 illustrates a graphical user interface (GUI) screen including a warning message which is displayed on the display unit of the client device of this embodiment. As illustrated in FIG. 10, the GUI screen 1000 contains the information relevant to the print job and a message box in which an error message 1002 generated in the above processing and information indicating a progressing status of the print job are displayed.

Referring back to FIG. 5, in step S512, it is determined whether elimination of the error has been reported from the remote printer, and it is determined whether the error has been canceled.

The determination at step S512 is repeated until the error has been canceled. The error message unit 226 is in a waiting condition until the error has been canceled.

On the other hand, when it is determined at step S512 that the error has been canceled, the control is transferred to step S513.

In step S513, the data delivering unit 222 determines whether a notice of end of the printing has been received from the remote printer, and determined whether the printing is completed.

When it is determined at step S513 that the printing is not yet completed, the control is transferred to the step S510 at which the steps S510-512 are repeated.

On the other hand, when it is determined at step S513 that the printing is completed, the processing of FIG. 5 is terminated.

Next, the network printing method which is performed by the printer server 110 and the client device 118 in the printer network system 100 of this embodiment will be described with reference to FIG. 6.

Figure 6:
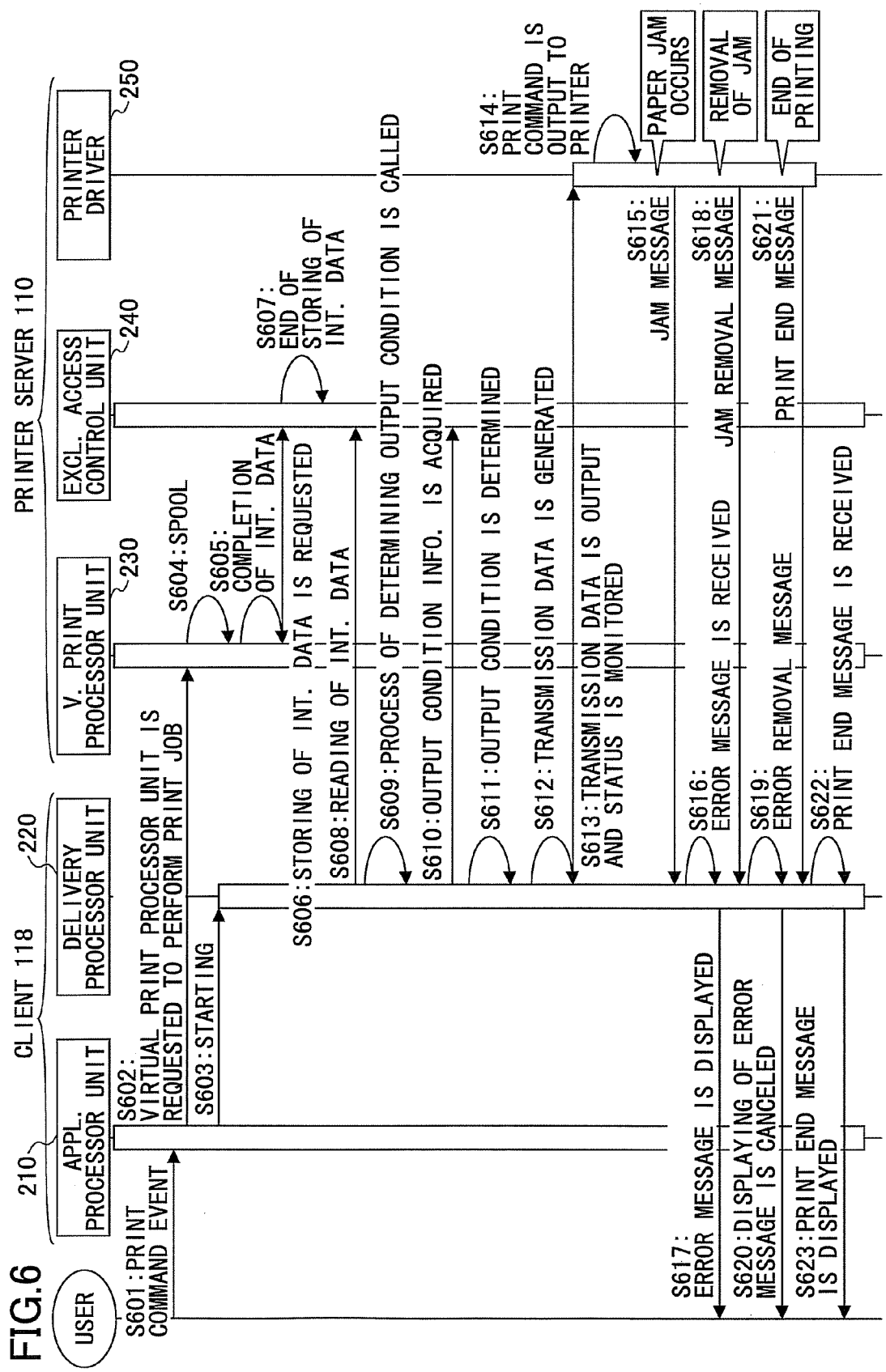
FIG. 6 is a sequence diagram for explaining the network printing method performed by the printer network system of this embodiment.

FIG. 6 is a sequence diagram for explaining the network printing method performed by the printer network system 100 of this embodiment.

In the network printing method illustrated in FIG. 6, a print command event is initiated from step S601 in response to the printing instructions from a user of the client device 118. In step S602, the application processor unit 210 of the client device 118 sends a request of a print job to the virtual print processor unit 230 in response to the print command event. In step S603, the delivery processor unit 220 is initiated on the client device 118.

In step S604, the virtual print processor unit 230 receives the request of the print job from the application processor unit 210 and spools the job data of the print job in response to the received request. In step S605, the intermediate data including the image data and the job definition data is generated. In step S606, the delivery processor unit 220 sends a storing request of the intermediate data to the exclusive access control unit 240. In step S607, the exclusive access control unit 240 stores the intermediate data in response to the received storing request, and completes the storing of the intermediate data.

On the other hand, in step S608, the delivery processor unit 220 of the client device 118 communicates with the exclusive access control unit 240 of the printer server 110, and reads out the intermediate data via the exclusive access control unit 240. In step S609, the output condition control unit 224 is called to perform the output condition determining process. In step S610, in order to determine the output destination, the delivery processor unit 220 communicates with the exclusive access control unit 240 of the printer server 110, and acquires the conditional information. In step S611, the delivery processor unit 220 causes the output condition control unit 224 to determine the output destination and to send it back to the data delivering unit 222. In step S612, the transmission data in the form that can be received by the printer driver is generated. In step S613, the generated transmission data is delivered to the printer driver of the determined output destination. Subsequently, the control is transferred to the monitoring of the status of the remote printer. In step S614, the printer driver 250 which has received the transmission data outputs a print command to the remote printer.

If an error, such as a paper jam, takes place during the monitoring of the status of the remote printer, in step S615, the printer driver 250 which has detected the error transmits an error message (for example, a notice of a paper jam) to the delivery processor unit 220. In step S616, the delivery processor unit 220 detects occurrence of the error in response to the error message from printer driver 250. In step S617, the delivery processor unit 220 causes the error message unit 226 to display the error message.

If the error is eliminated after occurrence of the error, in step S618, the printer driver 250 sends a notice of error elimination (for example, a notice of removal of the paper jam) to the delivery processor unit 220. In step S619, the delivery processor unit 220 detects that the error has been removed. In step S620, the delivery processor unit 220 causes the error message unit 226 to cancel the displaying of the error message.

If the printing job is completed during the monitoring of the status of the remote printer, in step S621, the printer driver 250 sends a print end message to the delivery processor unit 220. The delivery processor unit 220 detects in step S622 the end of the printing job in response to the print end message, and causes in step S623 the client device to display the print end message on the display unit.

Figure 9:
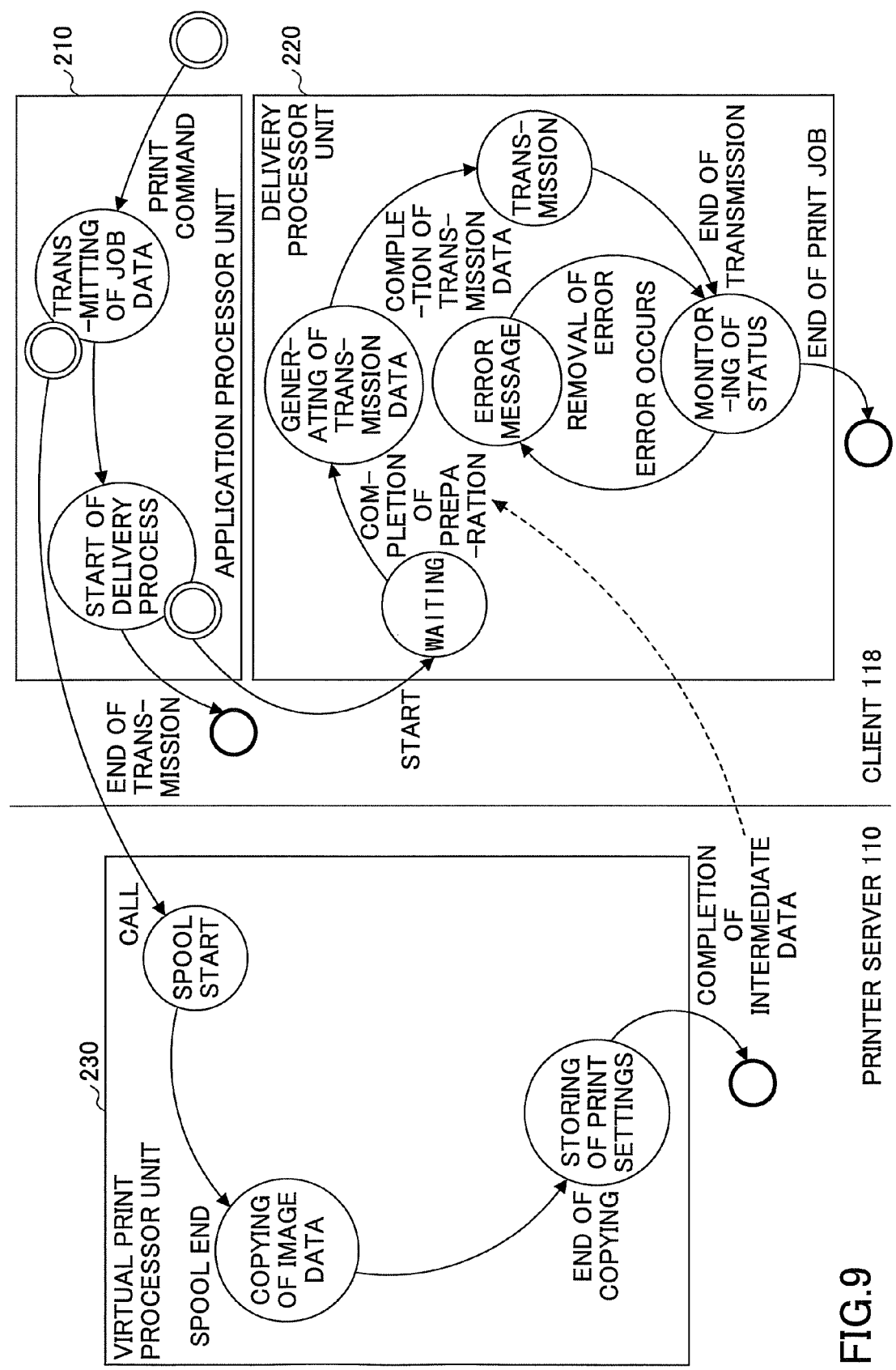
FIG. 9 is a diagram illustrating a state transition of the printer network system of this embodiment.

FIG. 9 illustrates a state transition 900 of the printer network system 100 of this embodiment.

As illustrated in FIG. 9, when a printing request is received from the user, the application processor unit 210 calls the virtual print processor unit 230 of the printer server 110 and starts transmission of the job data.

Subsequently, the application processor unit 210 starts the delivering process and initiates the delivery processor unit 220 on the client device. Subsequently, if the transmission of the job data is completed, the processing on the side of the application processor unit 210 is completed and the application processor unit 210 is released.

The delivery processor unit 220 initiated by the application processor unit 210 is temporarily placed in a waiting state. On the other hand, the virtual print processor unit 230 called by the application processor unit 210 starts the spooling of the job data. When the storing of the job data is completed, the virtual print processor unit 230 causes the virtual drawing unit 236 to copy the image data from the job data.

When the copying of the image data is completed, the virtual print processor unit 230 causes the data extracting unit 238 to store the print settings from the job data as the job definition data.

When all of the intermediate data items are completed and preparation of the print job is completed, the processing on the side of the virtual print processor unit 230 is completed, and the virtual print processor unit 230 is set in a waiting state or the control is transferred to the processing of a subsequently requested print job.

When the preparation of the print job by virtual print processor unit 230 is completed, the delivery processor unit 220 is restarted from the waiting state, acquires the intermediate data via the exclusive access control unit 240, and generates the transmission data. If generating of the transmission data is completed, the delivery processor unit 220 transmits the transmission data to the remote printer of the determined output destination. When the transmitting process is completed, the control is transferred to the monitoring of the status of the remote printer.

If occurrence of an error is detected during the monitoring of the status of the remote printer, the delivery processor unit 220 displays an error message. If the error is eliminated, the control is transferred to the monitoring of the status of the remote printer again.

If a print end message is received from the remote printer, the processing on the side of the delivery processor unit 220 is completed, and the processing of the print job is completed.

As illustrated in FIG. 9, in the printer network system 100 of this embodiment, the application processor unit 210 is released when the transmission of the job data of the high level image format is completed, and the subsequent processing is performed by the delivery processor unit 220 as the background processing. Hence, the time for the control to be returned to the application after the output of a printing request (or RTA: return to application) can be shortened.

The delivery processor unit 220 is in a waiting state and placed in the background of the application until generation of the required intermediate data is completed. When all of the intermediate data items are generated by the virtual print processor unit 230, the delivery processor unit 220 generates the transmission data and transmits it to the printer driver of the output destination.

On the other hand, the virtual print processor unit 230 can start performing the processing of a subsequently requested print job when all of the intermediate data items of the previously requested print job are generated. It is possible to maintain a high level of security of the information contained in the final printout. The job definition data and the image data of the high level image format are generated as intermediate data, and it is possible to maintain a high level of quality of the final printout.

Because the delivery processor unit 220 which outputs a print command to the printer driver 250 operates on the client device, the monitoring of the status of the remote printer and the warning of an error status of the remote printer can be performed appropriately. Hence, the user of the client device who has sent a printing request and needs error information thereof can correctly detect whether the print job is completed normally at the remote printer of the output destination or whether an error takes place and the print job is interrupted. Therefore, when dealing with confidential information, the user can easily detect whether the final printout is output at another output destination or detect whether the final printout is not output due to an error of the print job.

According to the embodiments of the present disclosure, in a network printing environment where a client device can use any of plural remote printers, the output conditions, including the output destination of a requested print job, are flexibly determined in accordance with the rules defined in association with the identifier information specific to the user or the identifier information specific to the client device. The printing may be performed at the appropriately selected remote printer in response to the print job, and the efficiency of business operations may be increased and the management of security of printed matters may be improved.

According to the embodiments of the present disclosure, the program module which is required for the client device is received from the printer server via the network, and it is possible to easily construct the network printer system according to the present disclosure in the existing environment.

The functions of the computer-readable recording medium according to the present disclosure may be carried out in accordance with a computer-readable program stored therein, and this program may be described in any of object-oriented programming languages, such as C, C++, C#, Java (registered trademark), etc. The computer-readable recording medium according to the present disclosure may be any of a hard disk, a CD-ROM, a MO, a DVD, a flexible disk, an EEPROM, an EPROM, etc., and the program stored therein may be distributed to another device and may be transmitted via the network to another device in a form that is executable by that device.

As described in the foregoing, according to the present disclosure, it is possible to provide a printer network system, a server device, and a computer-readable recording medium which are capable of selecting one of output destinations in an appropriate manner in a server/client environment to distribute a print job to the determined output destination, and capable of notifying a user of an error status of an image forming device in an appropriate manner to maintain a high level of security of the information contained in the final printout.

The present disclosure is not limited to the above-described embodiments, and variations and modifications may be made without departing from the scope of the present disclosure.

The present application is based on Japanese patent application No. 2009-189698, filed on Aug. 19, 2009, the contents of which are incorporated herein by reference in their entirety.

What is claimed is:

1. A printer network system including a client device and a server device connected to the client device via a network,
the server device comprising:
a virtual print processor unit to receive a request of a print job from an application unit of the client device and generate, in response to the request, image data as intermediate data of the print job and job definition data that define print settings of the print job; and
an exclusive access control unit to control exclusively writing and reading of the image data and the job definition data to and from a storage unit,
the client device comprising:
an output condition control unit to determine one of output destinations meeting conditional information in accordance with predetermined rules; and
a delivering unit to acquire the job definition data and the image data by communicating with the exclusive access control unit of the server device, select a printer driver corresponding to the determined output destination, and transmit a print command to the printer driver, wherein the exclusive access control unit updates a flag to indicate that writing of the intermediate data of the print job generated by the virtual print processor unit is completed, and the exclusive access control unit completes, in response to a data acquisition request from the delivering unit of the client device, transmission of the job definition data and the image data to the delivering unit after an end of writing of the intermediate data.

2. The printer network system according to claim 1, wherein the client device comprises an error message unit to display, when a notice of an error from the printer driver is received at the client device, an error message on a display unit of the client device to notify a user on the client device of an error occurring at the output destination.

3. A printer network system including a client device and a server device connected to the client device via a network,
the server device comprising:
a virtual print processor unit to receive a request of a print job from an application unit of the client device and generate, in response to the request, image data as intermediate data of the print job and job definition data that define print settings of the print job; and
an exclusive access control unit to control exclusively writing and reading of the image data and the job definition data to and from a storage unit,
the client device comprising:
an output condition control unit to determine one of output destinations meeting conditional information in accordance with predetermined rules; and
a delivering unit to acquire the job definition data and the image data by communicating with the exclusive access control unit of the server device, select a printer driver corresponding to the determined output destination, and transmit a print command to the printer driver, wherein the delivering unit and the output condition control unit are downloaded from the server device to the client device by using a point-and-print function.

4. The printer network system according to claim 1, wherein the virtual print processor unit generates the image data on a page basis, and before transmitting the print command, the delivering unit performs an affixing process of the image data of each page of the print job according to affixing information of the job definition data.

5. The printer network system according to claim 1, wherein the conditional information used to determine the output destination contains at least one information item chosen from a group including terminal inherent information specific to the client device, user inherent information specific to a login user of the application unit, print setting information of the print job, and content information of the print job.

6. A server device which is connected to a client device via a network, comprising:
a virtual print processor unit to receive a request of a print job from an application unit of the client device and generate, in response to the request, image data as intermediate data of the print job and job definition data that define print settings of the print job;

a program provision unit to provide a program for the client device, the program, when executed by a computer, causing the computer to operate as an output condition control unit of the client device which determines one of output destinations meeting conditional information in accordance with predetermined rules, and operate as a delivering unit of the client device which selects a printer driver corresponding to the determined output destination and transmits a print command to the printer driver; and an exclusive access control unit to control exclusively writing and reading of the image data and the job definition data to and from a storage unit and transmit the image data and the job definition data to the delivering unit of the client device.

7. The server device according to claim 6, wherein the program provision unit further provides a program for the client device, the program, when executed by a computer, causing the computer to operate as an error message unit of the client device which displays, when a notice of an error from the printer driver is received at the client device, an error message on a display unit of the client device to notify a user on the client device of an error occurring at the output destination.

8. The server device according to claim 6, wherein the exclusive access control unit updates a flag to indicate that writing of the intermediate data of the print job generated by the virtual print processor unit is completed, and the exclusive access control unit completes, in response to a data acquisition request from the delivering unit of the client device, transmission of the job definition data and the image data to the delivering unit after an end of writing of the intermediate data.

9. The server device according to claim 6, wherein the program provision unit causes the client device to install the delivering unit and the output condition control unit in the client device by a point-and-print function.

10. A non-transitory computer-readable recording medium storing a program which, when executed by a computer, causes the computer to execute a network printing method in a server device connected to a client device via a network, the method comprising:

generating, by a virtual print processor unit, in response to a request of a print job received from an application unit of the client device, image data as intermediate data of the print job and job definition data that define print settings of the print job;

providing, by a program provision unit, a program for the client device, the program, when executed by a computer, causing the computer to operate as an output condition control unit of the client device which determines one of output destinations meeting conditional information in accordance with predetermined rules, and operate as a delivering unit of the client device which selects a printer driver corresponding to the determined output destination and transmits a print command to the printer driver; and exclusively controlling, by an exclusive access control unit, writing and reading of the image data and the job definition data to and from a storage unit, and transmitting the image data and the job definition data to the delivering unit of the client device.

11. The non-transitory computer-readable recording medium according to claim 10, wherein the method further comprises providing, by the program provision unit, a program for the client device, the program, when executed by a computer, causing the computer to operate as an error message unit of the client device which displays, when a notice of an error from the printer driver is received at the client device, an error message on a display unit of the client device to notify a user on the client device of an error occurring at the output destination.

12. The non-transitory computer-readable recording medium according to claim 10, wherein the method further comprises:

updating, by the exclusive access control unit, a flag to indicate that writing of the intermediate data of the print job is completed; and completing, by the exclusive access control unit, in response to a data acquisition request from the delivering unit of the client device, transmission of the job definition data and the image data to the delivering unit after an end of writing of the intermediate data.

13. The printer network system according to claim 3, wherein the virtual print processor unit generates the image data on a page basis, and before transmitting the print command, the delivering unit performs an affixing process of the image data of each page of the print job according to affixing information of the job definition data.

* * * * *